(12) United States Patent
Kim et al.

(10) Patent No.: US 7,369,625 B2
(45) Date of Patent: May 6, 2008

(54) APPARATUS AND METHOD FOR SLICING RF SIGNAL AND COMPENSATING FOR THE SLICE LEVEL OF RF SIGNAL IN DISK DRIVE

(75) Inventors: Joo-yeup Kim, Gyeonggi-do (KR); Sung-ro Go, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 767 days.

(21) Appl. No.: 10/120,191

(22) Filed: Apr. 11, 2002

(65) Prior Publication Data

US 2002/0181616 A1 Dec. 5, 2002

(30) Foreign Application Priority Data

Apr. 11, 2001 (KR) ................ 2001-19263

(51) Int. Cl.
*H03K 9/00* (2006.01)
*G11B 20/10* (2006.01)
*G11B 27/02* (2006.01)

(52) U.S. Cl. ................ 375/316; 369/59.17; 369/47.15; 369/47.35; 369/53.34; 369/59.18; 369/124.15

(58) Field of Classification Search ................ 375/316, 375/318, 345, 286; 327/58–60, 100, 172, 327/345, 72–74, 95, 134, 62; 348/476, 622; 369/59, 59.17, 47.5, 53.26, 59.26, 59.1, 275.1, 369/0.3, 124, 59.18, 50, 53.35, 44.25, 47.15, 369/53.31, 47.35, 53.34, 15, 53.17; 725/136

See application file for complete search history.

(56) References Cited

U.S. PATENT DOCUMENTS 4,015,108 A * 3/1977 Morton .................. 377/10

(Continued)

FOREIGN PATENT DOCUMENTS

JP 06-28675 2/1994

(Continued)

OTHER PUBLICATIONS

Japanese Official Action mailed Jun. 9, 2005 in Japanese Patent Application No. 2002-104102 related to the present above-identified pending US patent application, 10 pages.

(Continued)

*Primary Examiner*—Mohammed Ghayour
*Assistant Examiner*—Sophia Vlahos
(74) *Attorney, Agent, or Firm*—Staas & Halsey LLP (57) ABSTRACT

An apparatus and method for slicing an RF signal and compensating for the slice level of an RF signal reproduced from a disk, which minimizes a block error rate by optimizing the slice level of the RF signal according to variations in symmetry of the RF signal when slicing the RF signal. A comparator converts the RF signal reproduced from the disk into a digital signal by comparing the RF signal with a slice level, a low-pass filter low-pass filters the digital signal and provides the result to the comparator as the slice level, and a slice level compensator compensates for the slice level provided to the comparator by the low-pass filter according to variations in symmetry of the RF signal.

17 Claims, 2 Drawing Sheets

U.S. PATENT DOCUMENTS

| | | | |
|---|---|---|---|
| 4,706,236 A * | 11/1987 | Yoda | 369/59.18 |
| 4,829,499 A * | 5/1989 | Abe | 369/59.15 |
| 4,965,782 A * | 10/1990 | Mathews | 369/47.35 |
| 4,975,657 A * | 12/1990 | Eastmond | 330/279 |
| 5,134,607 A * | 7/1992 | Fuji et al. | 369/124.15 |
| 5,377,054 A * | 12/1994 | Yamaguchi et al. | 360/39 |
| 5,444,688 A * | 8/1995 | Fuji | 369/59.15 |
| 5,490,127 A * | 2/1996 | Ohta et al. | 369/47.51 |
| 5,559,560 A * | 9/1996 | Lee | 348/465 |
| 5,696,757 A * | 12/1997 | Ozaki et al. | 369/47.35 |
| 5,832,039 A * | 11/1998 | Rijns | 375/317 |
| 5,841,751 A * | 11/1998 | Komazaki et al. | 369/53.33 |
| 5,920,534 A * | 7/1999 | Furuta et al. | 369/59.18 |
| 6,028,829 A * | 2/2000 | Yamazaki | 369/53.24 |
| 6,069,499 A * | 5/2000 | Cho et al. | 327/58 |
| 6,130,871 A * | 10/2000 | Watabe | 369/47.46 |
| 6,272,102 B1 * | 8/2001 | Kahlman | 369/124.01 |
| 6,292,448 B1 * | 9/2001 | Yoshida et al. | 369/53.27 |
| 6,333,902 B1 * | 12/2001 | Shim | 369/47.54 |
| 6,389,548 B1 * | 5/2002 | Bowles | 713/500 |
| 6,396,787 B1 * | 5/2002 | Lee et al. | 369/59.18 |
| 6,459,315 B2 * | 10/2002 | Orii | 327/172 |
| 6,526,007 B1 * | 2/2003 | Fujita | 369/44.32 |
| 6,557,126 B1 * | 4/2003 | Kelly | 714/708 |
| 6,611,485 B2 * | 8/2003 | Kim et al. | 369/59.18 |
| 6,680,891 B2 * | 1/2004 | Kim et al. | 369/53.31 |
| 6,704,252 B2 * | 3/2004 | Aso et al. | 369/30.11 |
| 6,735,260 B1 * | 5/2004 | Eliezer et al. | 375/316 |
| 6,798,725 B1 * | 9/2004 | Horibe et al. | 369/47.14 |
| 6,807,134 B2 * | 10/2004 | Nakajima et al. | 369/47.35 |
| 7,023,790 B2 * | 4/2006 | Ueki | 369/275.3 |

FOREIGN PATENT DOCUMENTS

| | | |
|---|---|---|
| JP | 06-325365 | 11/1994 |
| JP | 08-31101 | 2/1996 |
| JP | 2000-48367 | 2/2000 |
| JP | 2000-200420 | 7/2000 |
| JP | 2000-276848 | 10/2000 |
| JP | 2001-53650 | 2/2001 |
| KR | 2000-9001 | 2/2000 |

OTHER PUBLICATIONS

Japanese Final Office Action datedJan. 19, 2006 by the Japanese Patent Office in the Japanese Application No. 2002-104102 corresponding to the present above-identified pending US patent application, 2 pages.

\* cited by examiner

APPARATUS AND METHOD FOR SLICING RF SIGNAL AND COMPENSATING FOR THE SLICE LEVEL OF RF SIGNAL IN DISK DRIVE

CROSS-REFERENCE TO RELATED APPLICATIONS

This application claims the benefit of Korean Patent Application No. 2001-19263, filed on Apr. 11, 2001, in the Korean Intellectual Property Office, the disclosure of which is incorporated herein by reference.

BACKGROUND OF THE INVENTION

1. Field of the Invention

The present invention relates to an apparatus and method for slicing a radio frequency (RF) signal in a disk drive, and more particularly, to an apparatus and method for slicing a disk drive RF signal and compensating for the slice level of the RF signal, which is capable of optimizing the slice level of the RF signal in accordance with variation in the symmetry of the RF signal.

2. Description of the Related Art

Figure 1:
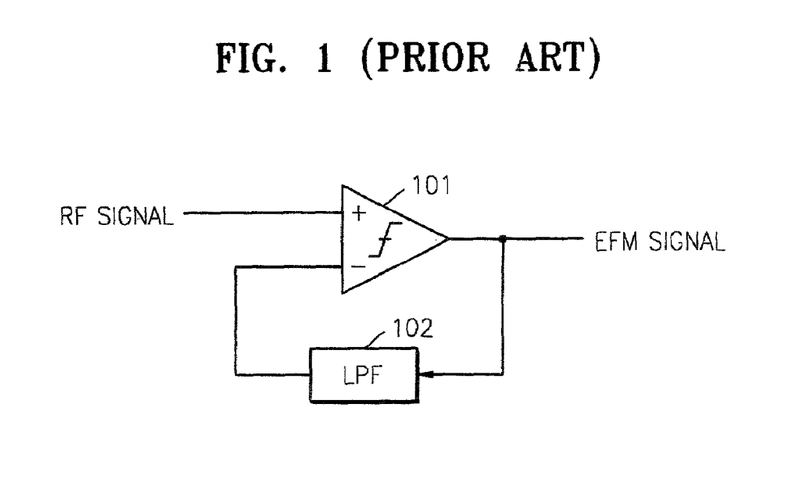
FIG. 1 is a circuit diagram of a conventional apparatus for slicing an RF signal.

Disk drives are devices for reproducing data recorded on a disk, such as CD-DA/ROM/R/RW or DVD-ROM/R/RW/RAM, or recording data on the disk. Such disk drives include an apparatus for slicing an RF signal, which converts an RF signal reproduced from a disk into a digital signal. FIG. 1 is a circuit diagram of a conventional apparatus for slicing an RF signal. Hereinafter, conventional processes for slicing an RF signal will be described with reference to FIG. 1.

When an RF signal reproduced from a disk (not shown) is applied to a positive terminal (+) of a comparator 101, the comparator 101, which is comprised of a Schmitt's trigger, slices the RF signal. In other words, the comparator 101 compares a level of a digital RF signal, which is fed back to a negative terminal (−) of the comparator 101 via a low pass filter 102, with a level of the RF signal, which is currently being applied to the positive terminal (+) of the comparator 101, and outputs a digitalized RF signal. The digitalized RF signal is called an "eight to fourteen modulation (EFM) signal."

As described above, the conventional apparatus for slicing an RF signal simply uses the result of low-pass filtering and the output of the comparator 101 as a reference level (slice level) required to slice an RF signal. Accordingly, if the degree of symmetry of an RF signal recorded on a disk is too high or the beta value of the RF signal is very low due to errors in disk mastering or recording, the information on the disk may not be normally reproduced and various errors may be caused that increase a block error rate.

SUMMARY OF THE INVENTION

To solve the above-described problems, it is an object of the present invention to provide an apparatus and method for slicing an RF signal and compensating for the slice level of an RF signal, which is capable of minimizing a block error rate by optimizing the slice level of an RF signal in accordance with a variation in the symmetry of the RF signal.

Additional objects and advantages of the invention will be set forth in part in the description which follows and, in part, will be obvious from the description, or may be learned by practice of the invention.

Accordingly, to achieve the above and other objects, there is provided an apparatus for slicing an RF signal in a disk drive, the apparatus comprising a comparator, which converts an RF signal reproduced from a disk into a digital signal by comparing the RF signal with a slice level, a low-pass filter, which low-pass filters the digital signal and provides the result to the comparator as the slice level, and a slice level compensator, which compensates for the slice level provided to the comparator by the low-pass filter in accordance with variations in the symmetry of the RF signal.

According to another aspect of the present invention, there is provided an apparatus for compensating for a slice level in an apparatus for slicing an RF signal, which converts an RF signal reproduced from a disk into a digital signal, the apparatus for compensating for the slice level comprising a peak holder, which detects and holds peak levels of the RF signal, a bottom holder, which detects and holds bottom levels of the RF signal, a low-pass filter, which low-pass filters the RF signal, a controller, which measures variations in the symmetry of the RF signal using outputs of the peak holder, the bottom holder, and the low-pass filter and determines an amount by which the slice level will be compensated according to the measured variation in the symmetry of the RF signal, and a slice level adjuster, which adjusts the slice level based on the determined amount by which the slice level will be compensated.

Also, the present invention provides a method of slicing an RF signal reproduced from a disk in a disk drive, the method comprising determining an amount to compensate a slice level used to convert the RF signal into a digital signal by measuring variations in symmetry of the RF signal, adjusting the slice level based on the determined amount by which the slice level will be compensated, and outputting a digital signal corresponding to the RF signal by comparing the level of the RF signal with the adjusted slice level.

According to another aspect of the present invention, there is provided a method of compensating for a slice level in an apparatus for slicing an RF signal, which converts an RF signal reproduced from a disk into a digital signal, the method comprising, detecting and holding peak levels of the RF signal, detecting and holding bottom levels of the RF signal, low-pass filtering the RF signal, measuring variations in symmetry of the RF signal using the peak levels of the RF signal, the bottom levels of the RF signal and the result of the low-pass filtering of the RF signal, determining an amount to compensate the slice level based on the measured variations in the symmetry of the RF signal, and adjusting the slice level based on the determined amount by which the slice level will be compensated.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The example embodiments are described below to explain the present invention by referring to the figures.

Figure 2:
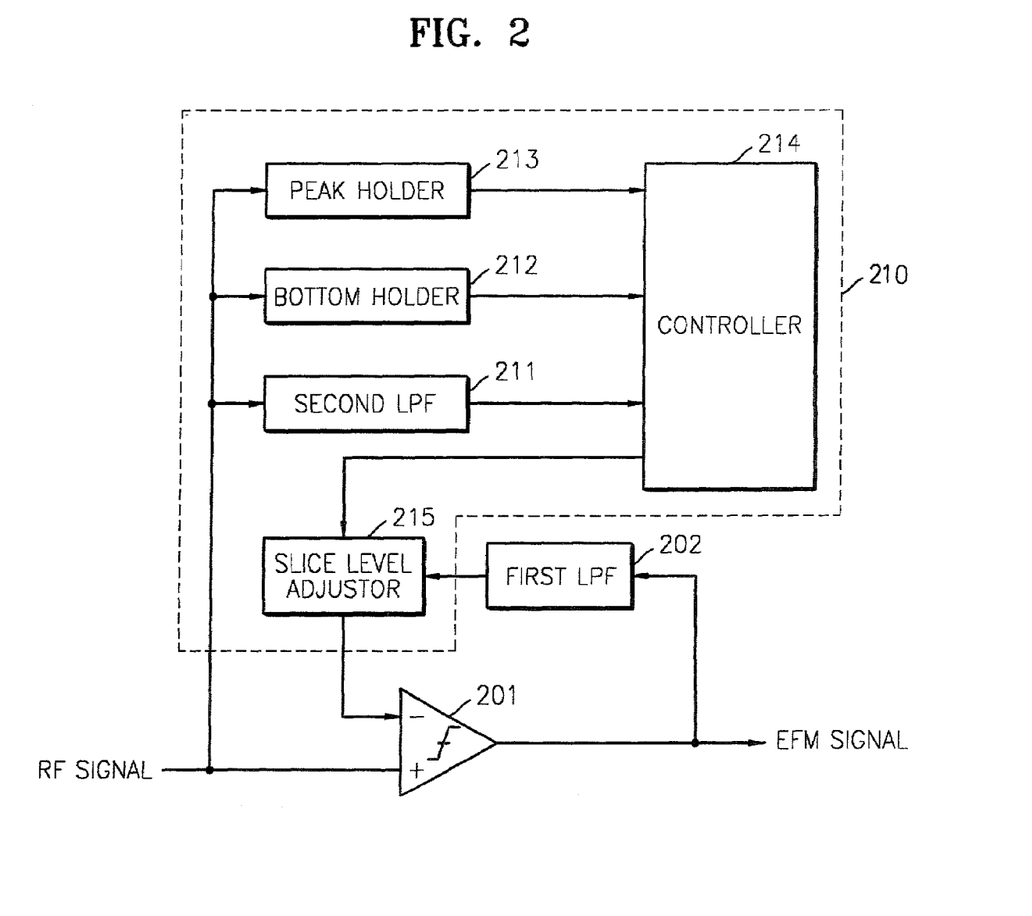
FIG. 2 is a block diagram of an apparatus for slicing an RF signal according to an embodiment of the present invention.

Referring to FIG. 2, an apparatus for slicing an RF signal includes a comparator 201, a first low-pass filter (LPF) 202, and a slice level compensator 210. The slice level compensator 210 includes a second low-pass filter 211, a bottom holder 212, a peak holder 213, a controller 214, and a slice level adjustor 215. The comparator 201 and the first low-pass filter 202 have the same structure and operation as the comparator 101 and the low-pass filter 102, respectively, shown in FIG. 1, and thus their descriptions will be omitted.

Figure 3:
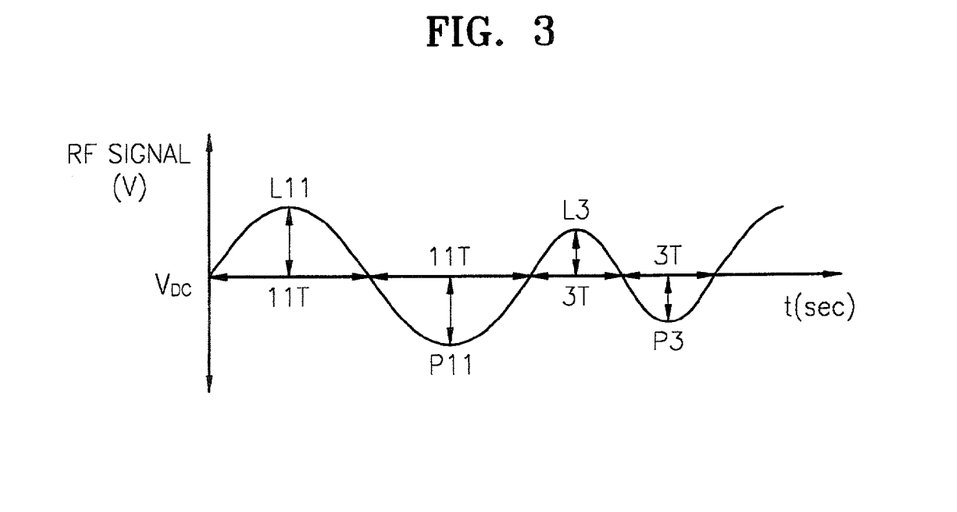
FIG. 3 is a diagram illustrating an example of a waveform of a reproduced RF signal.

The second low-pass filter 211 filters an RF signal reproduced from a disk (not shown) and provides data corresponding to average values of the RF signal to the controller 214. For example, the second low-pass filter 211 provides to the controller 214 voltage levels (points where voltage reaches 0) of the RF signal in accordance with time, as shown in FIG. 3.

The bottom holder 212 detects bottom levels of the RF signal based upon pit lengths T according to time and reproduced from the disk. Next, the bottom holder 212 transmits the detected bottom levels of the RF signal to the controller 214 and maintains the detected bottom levels of the RF signal. For example, when the waveform of the RF signal is the same as that shown in FIG. 3 (where P designates 'Pit' and L designates 'Land'), the bottom holder 212 detects the levels of the RF signal corresponding to P11 and P3 as bottom levels B and provides the detected bottom levels B to the controller 214, while maintaining the detected bottom levels of the RF signal.

The peak holder 213 detects peak levels of the RF signal based upon pit lengths T according to time and applied thereto and transmits the detected peak levels of the RF signal to the controller 214 while maintaining the detected peak levels of the RF signal. In other words, when the waveform of the RF signal applied to the peak holder 214 is same as that shown in FIG. 3, the peak holder 214 detects the levels of the RF signal corresponding to L11 and L3 as peak levels P and provides the peak levels P to the controller 214, while maintaining the detected peak level of the RF signal. In FIG. 3, L11, L3, P11 and P3 have positive values, where, for example, L11 is greater than $V_{DC}$ and P11 is smaller than $V_{DC}$.

When the second low-pass filter 211, the bottom holder 212, and the peak holder 213 apply their respective outputs to the controller 214, the controller 214 measures variations in symmetry of the RF signal based on the outputs of the second low-pass filter 211, the bottom holder 212, and the peak holder 213. Next, the controller 214 determines an amount to compensate the slice level of the RF signal according to variations in the symmetry of the RF signal. The controller 214 provides the determined amount by which the slice level of the RF signal will be compensated, to the slice level adjustor 215.

Figure 4:
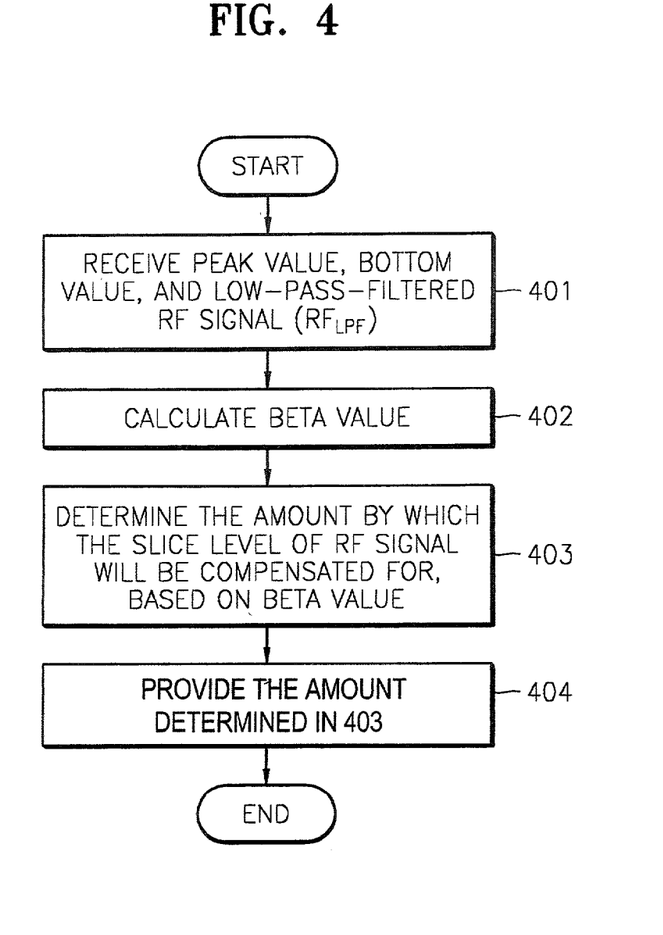
FIG. 4 is a flow chart illustrating the operation of a controller shown in FIG. 2.

FIG. 4 is a flow chart illustrating operation of the controller 214. When the peak and bottom values of an RF signal and the low pass filtered RF signal are applied/output to the controller 214 in operation 401, the controller 214 computes a beta (b) value in operation 402. The beta (b) value can be obtained from the following equation.

$$\beta(\%) = \frac{(B_{LT} - RF_{LPF}) + (P_{PT} - RF_{LPF})}{(B_{LT} - RF_{LPF}) - (P_{PT} - RF_{LPF})} \times 100 \quad (1)$$

Equation (1) is an expression for a beta value based upon pit lengths T according to time, where T is a reproduction clock. The beta value is inversely proportional to degree of symmetry of a mastered or recorded disk. FIG. 3, is a diagram illustrating example waveforms of a reproduced RF signal according to time. For example, Equation (2) expresses a beta value with use of a peak value, a bottom value, and average values of an RF signal for an 11T pit, as shown in FIG. 3. In Equation (2), BL11 represents a bottom value of the RF signal for an 11T pit. PP11 represents a peak value of the RF signal for the 11T pit. And RFLPF represents a low pass filtered level of the RF signal.

$$\beta(\%) = \frac{(B_{L11} - RF_{LPF}) + (P_{P11} - RF_{LPF})}{(B_{L11} - RF_{LPF}) + (P_{P11} - RF_{LPF})} \times 100 \quad (2)$$

In operation 403, the controller 214 determines the amount by which the slice level of the RF signal will be compensated based on the beta value obtained in operation 402. In other words, the controller 214 determines the amount to compensate the slice level of the RF signal by selecting, for example, from a previously stored table, an appropriate value corresponding to the beta value computed in operation 402 or by identifying whether the beta value computed in operation 402 is within a predetermined range. When the beta value is not within the predetermined range further identifying whether the beta value is no greater than the minimum value in the predetermined range or no less than the maximum value in the predetermined range. The predetermined range is a range within which there is no need to compensate for the slice level of an RF signal.

In a case where the slice level of an RF signal is below the minimum value in the predetermined range, the slice level of the RF signal is determined to be increased. In a case where the slice level of an RF signal exceeds the maximum value in the predetermined range, the slice level of the RF signal is determined to be decreased. In a case where the slice level of an RF signal is within the predetermined range, there is no need to compensate for the slice level of the RF signal. Since the beta value is inversely proportional to the degree of symmetry of the RF signal, and the amount to compensate the slice level of an RF signal is determined based on the beta value, variations in the symmetry of the RF signal can be sufficiently reflected in the degree of symmetry of the RF signal.

As described above, if in operation 403, the amount to compensate the slice level of an RF signal is determined based on the beta value obtained in operation 402, in operation 404 the controller 214 provides the determined amount to compensate the slice level of the RF signal to the slice level adjustor 215.

The slice level adjustor 215 adjusts slice level of an RF signal output from the first low-pass filter 202 (the level of a reference signal of the comparator 201) based on the amount to compensate the slice level as determined by the controller 214. Next, the slice level adjustor 215 transmits the adjusted slice level of the RF signal to a negative terminal (−) of the comparator 201.

The comparator 201 can output an EFM signal appropriately compensated for a slice level of an RF signal in accordance with variations in symmetry of the RF signal. The EFM signal corresponds to an analog RF signal.

In a method of slicing an RF signal according to the present invention, a beta value is computed to measure variations in symmetry of the RF signal reproduced from a disk. Next, the amount to compensate the slice level of the RF signal is determined based on the computed beta value. Next, the slice level of the RF signal is adjusted in accordance with the determined amount by which the slice level of the RF signal will be compensated. Here, the slice level of the RF signal will be used to convert the RF signal reproduced from the disk (not shown) into a digital signal. Next, the digital signal corresponding to the RF signal reproduced from the disk is output by comparing the RF signal and the adjusted slice level of the RF signal.

In a method of compensating for the slice level of an RF signal according to the present invention, peak levels and bottom levels of the RF signal reproduced from a disk are detected and held. Next, a result of filtering the RF signal through a low-pass filter is obtained. Next, variations in symmetry of the RF signal are measured using the peak and bottom levels of the RF signal and the result of filtering the RF signal through the low-pass filter. It is possible to measure the variations in the symmetry of the RF signal by computing a beta value expressed in Equation (1). Next, the amount by which the slice level of the RF signal will be compensated for is determined based on variation in the symmetry of the RF signal. Next, the slice level of the RF signal is adjusted based on the determined amount.

According to the present invention, it is possible to precisely control a slice level of an RF signal reproduced from a disk when slicing the RF signal even in a case where the symmetry of the RF signal recorded on the disk is varied due to errors in disk mastering or recording. Accordingly, it is possible to minimize a block error rate in reproducing the RF signal from the disk and thus enhance reproducing performance of a disk drive.

While this invention has been particularly shown and described with reference to example embodiments thereof, it will be understood by those skilled in the art that various changes in form and details may be made therein without departing from the spirit and scope of the invention as defined by the appended claims. For example, the example embodiment of the present invention described relates to a case of compensating for a slice level of an RF signal by computing a beta value. However, the slice level of the RF signal may be compensated by computing degree of symmetry of the RF signal as follows:

$$RF_{symmetry}(\%) = \frac{0.5[AVG\{(P_{LT(min)} - RF_{LPF}) + (B_{PT(min)} - RF_{LPF})\} - AVG\{(P_{LT(max)} - RF_{LPF}) + (B_{PT(max)} - RF_{LPF})\}]}{AVG[(P_{LT(max)} - RF_{LPF}) - (B_{PT(max)} - RF_{LPF})]} \times 100 \quad (3)$$

In Equation 3, AVG designates an average, $P_{LT(min)}$ designates a Peak Land of minimum T, $B_{PT(min)}$ designates a Bottom Pit of minimum T, $P_{LT(max)}$ designates a Peak Land of maximum, and $B_{PT(max)}$ designates a Bottom Pit of maximum T. For reference, if the value of T is wider, the amplitude of Land and Pits are greater. However, when T reaches a certain value, the amplitude of Pits and Lands may be saturated.

For example, the degree of the symmetry of the RF signal shown in FIG. 3 for 3T and 11T pits can be obtained from the following equation.

$$RF_{symmetry}(\%) = \frac{0.5[\{(P_{L3} - RF_{LPF}) + (B_{L3} - RF_{LPF})\} - \{(P_{P11} - RF_{LPF}) + (B_{L11} - RF_{LPF})\}]}{(B_{L11} - RF_{LPF}) - (P_{P11} - RF_{LPF})} \times 100 \quad (4)$$

What is claimed is:

1. An apparatus for slicing an unfiltered RF signal from a disk in a disk drive, the apparatus comprising:
    a comparator which converts the RF signal into a digital signal by comparing the RF signal with a reference slice level;
    a first low-pass filter which low-pass filters the digital signal to provide a filtered signal to the comparator as the reference slice level; and
    a reference slice level compensator which compensates the reference slice level provided to the comparator by the low-pass filter, according to a variation in symmetry of the RF signal using a bottom level and a peak level of the unfiltered RF signal for a pit length according to time and values of a filtered RF signal for the pit length according to time.

2. An apparatus for slicing an unfiltered RF signal from a disk in a disk drive, the apparatus comprising:
    a comparator which converts the RF signal into a digital signal by comparing the RF signal with a reference slice level;
    a first low-pass filter which low-pass filters the digital signal to provide a filtered signal to the comparator as the reference slice level; and
    a reference slice level compensator which compensates the reference slice level provided to the comparator by the low-pass filter, according to a variation in symmetry of the RF signal,
    wherein the slice level compensator identifies the variation in the symmetry of the RF signal by determining a beta value of the RF signal to determine an amount by which to compensate the slice level, the beta value being a value indicative of a variation in symmetry of the RF signal, the beta value being measured using a bottom level and a peak level of the unfiltered RF signal for a pit length according to time and values of a filtered RF signal for the pit length according to time.

3. An apparatus for slicing an RF signal from a disk in a disk drive, the apparatus comprising:
    a comparator which converts the RF signal into a digital signal by comparing the RF signal with a reference slice level;
    a first low-pass filter which low-pass filters the digital signal to provide a filtered signal to the comparator as the reference slice level; and
    a reference slice level compensator which compensates the reference slice level provided to the comparator by the low-pass filter, according to a variation in symmetry of the RF signal,
    wherein the slice level compensator identifies the variation in the symmetry of the RF signal by determining a beta value of the RF signal to determine an amount by which to compensate the slice level, the beta value being a value indicative of a variation in symmetry of the RF signal, and
    wherein when the beta value is measured below a minimum value in a predetermined range, the slice level compensator determines the amount to compensate the slice level so that the slice level will be increased, and when the beta value is measured over a maximum value in the predetermined range, the slice level compensator determines the amount to compensate the slice level so that the slice level will be decreased.

4. An apparatus for slicing an unfiltered RF signal from a disk in a disk drive, the apparatus comprising:
a comparator which converts the RF signal into a digital signal by comparing the RF signal with a reference slice level;
a first low-pass filter which low-pass filters the digital signal to provide a filtered signal to the comparator as the reference slice level; and
a reference slice level compensator which compensates the reference slice level provided to the comparator by the low-pass filter, according to a variation in symmetry of the RF signal,
wherein the slice level compensator detects the variation in symmetry of the RF signal using a bottom level and a peak level of the unfiltered RF signal for a pit length according to time and a value of a filtered RF signal for the pit length according to time output by a second low-pass filter.

5. An apparatus for compensating a reference slice level in a device for slicing an unfiltered RF signal, which converts the RF signal reproduced from a disk into a digital signal by comparing the RF signal with a filtered signal provided from a first low-pass filter as the reference slice level, the apparatus comprising:
a peak holder which detects and holds a peak level of the unfiltered RF signal for a pit length according to time;
a bottom holder which detects and holds a bottom level of the unfiltered RF signal for the pit length according to time;
a second low-pass filter which low-pass filters the unfiltered RF signal to output a value of the filtered RF signal for the pit length according to time;
a controller which measures a variation in symmetry of the RF signal using outputs of the peak holder, the bottom holder, and the second low-pass filter and determines an amount to compensate the reference slice level in accordance with the measured variation in the symmetry of the RF signal; and
a slice level adjuster which adjusts the reference slice level based on the determined amount to compensate the reference slice level.

6. A method of slicing an unfiltered RF signal reproduced from a disk in a disk drive, the method comprising:
determining an amount to compensate a reference slice level used to convert the RF signal into a digital signal by comparing the RF signal with a first filtered signal provided as the reference slice level by measuring a variation in symmetry of the RF signal using a result of low-pass filtering of the RF signal, the variation in symmetry of the unfiltered RF signal being determined by using a measured bottom level and a peak level of the unfiltered RF signal for a pit length according to time, and a value of a second filtered RF signal for the pit length according to time;
adjusting the reference slice level based on the determined amount to compensate the reference slice level; and
outputting a digital signal corresponding to the RF signal by comparing a level of the RF signal with the adjusted reference slice level.

7. A method of slicing an unfiltered RF signal reproduced from a disk in a disk drive, the method comprising:
determining an amount to compensate a reference slice level used to convert the RF signal into a digital signal by measuring a variation in symmetry of the RF signal;
adjusting the reference slice level based on the determined amount to compensate the reference slice level; and
outputting a digital signal corresponding to the RF signal by comparing a level of the RF signal with the adjusted reference slice level,
wherein the measuring of the variation in the symmetry of the RF signal is performed using a beta value of the RF signal, the beta value being a value indicative of a variation in symmetry of the RF signal and being measured using a bottom level and a peak level of the unfiltered RF signal for a pit length according to time and a value of a filtered RF signal for the pit length according to time.

8. A method of compensating a reference slice level in an apparatus for slicing an unfiltered RF signal from a disk, which converts the RF signal into a digital signal by comparing the RF signal with a filtered signal provided as the reference slice level, the method comprising:
detecting and holding a peak level of the unfiltered RF signal;
detecting and holding a bottom level of the unfiltered RF signal;
low-pass filtering the unfiltered RF signal;
measuring a variation in symmetry of the RF signal using the peak level and the bottom level of the RF signal for a pit length according to time and a result of the low-pass filtering of the RF signal for the pit length according to time;
determining an amount to compensate the reference slice level based on the measured variation in the symmetry of the RF signal; and
adjusting the reference slice level based on the determined amount to compensate the slice level.

9. A method of compensating for a reference slice level in an apparatus for slicing an unfiltered RF signal from a disk, which converts the RF signal into a digital signal, the method comprising:
detecting and holding a peak level of the unfiltered RF signal;
detecting and holding a bottom level of the unfiltered RF signal;
low-pass filtering the unfiltered RF signal;
measuring a variation in symmetry of the RF signal using the peak level and the bottom level of the RF signal for a pit length according to time and a result of the low-pass filtering of the RF signal for the pit length according to time;
determining an amount to compensate the reference slice level based on the measured variation in the symmetry of the RF signal; and
adjusting the reference slice level based on the determined amount to compensate the slice level,
wherein measuring the variation in the symmetry of the RF signal is performed using a beta value of the RF signal, the beta value being a value indicative of a variation in symmetry of the RF signal and being measured using a bottom level and a peak level of the unfiltered RF signal and a filtered RF signal.

10. An apparatus for compensating a reference slice level in a device for slicing an unfiltered RF signal from a disk, which converts the RF signal into a digital signal, the apparatus comprising:

a peak holder which detects and holds a peak level of the unfiltered RF signal for a pit length according to time;
a bottom holder which detects and holds a bottom level of the unfiltered RF signal for the pit length according to time;
a low-pass filter which low-pass filters the unfiltered RF signal to output a value of the filtered RF signal for the pit length according to time;
a controller which measures a variation in symmetry of the RF signal by using outputs of the peak holder, the bottom holder, and the low-pass filter to compute a beta value of the RF signal, the beta value being a value indicative of a variation in symmetry of the RF signal; and
a slice level adjuster which adjusts the reference slice level based on the beta value.

11. An apparatus for compensating a reference slice level in a device for slicing an RF signal from a disk, which converts the RF signal into a digital signal, the apparatus comprising:
a peak holder which detects and holds a peak level of the RF signal;
a bottom holder which detects and holds a bottom level of the RF signal;
a low-pass filter which low-pass filters the RF signal;
a controller which measures a variation in symmetry of the RF signal by using outputs of the peak holder, the bottom holder, and the low-pass filter to compute a beta value of the RF signal; and
a slice level adjuster which adjusts the reference slice level based on the beta value;
wherein the beta value is inversely proportional to the symmetry of the RF signal and computed according to an equation of $$\beta(\%) = \frac{(B_{LT} - RF_{LPF}) + (P_{PT} - RF_{LPF})}{(B_{LT} - RF_{LPF}) - (P_{PT} - RF_{LPF})} \times 100$$

and wherein $B_{LT}$ represents the bottom level, $P_{PT}$ represents the peak level and $RF_{LPF}$ represents the low pass filter level of the RF signal, based upon pit lengths T detected from the RF signal.

12. A method for compensating a reference slice level in a device for slicing an unfiltered RF signal from a disk, which converts the RF signal into a digital signal, the method comprising:
detecting and holding a peak level of the unfiltered RF signal;
detecting and holding a bottom level of the unfiltered RF signal;
low-pass filtering the unfiltered RF signal;
measuring a variation in symmetry of the RF signal by using the peak level and the bottom level of the RF signal for a pit length according to time and a result of the low-pass filtering of the RF signal for the pit length according to time to compute a beta value of the RF signal, the beta value being a value indicative of a variation in symmetry of the RF signal; and
adjusting the reference slice level based on the beta value.

13. A method for compensating a reference slice level in a device for slicing an RF signal from a disk, which converts the RF signal into a digital signal, the method comprising:
detecting and holding a peak level of the RF signal;
detecting and holding a bottom level of the RF signal;
low-pass filtering the RF signal;
measuring a variation in symmetry of the RF signal by using the peak level and the bottom level of the RF signal and a result of the low-pass filtering the RF signal to compute a beta value of the RF signal; and
adjusting the reference slice level based on the beta value;
wherein the beta value is inversely proportional to the symmetry of the RF signal and computed according to an equation of $$\beta(\%) = \frac{(B_{LT} - RF_{LPF}) + (P_{PT} - RF_{LPF})}{(B_{LT} - RF_{LPF}) - (P_{PT} - RF_{LPF})} \times 100$$

and wherein $B_{LT}$ represents the bottom level, $P_{PT}$ represents the peak level and $RF_{LPF}$ represents the low pass filter level of the RF signal based upon pit lengths T detected from the RF signal.

14. An apparatus for compensating a reference slice level in a device for slicing an unfiltered RF signal from a disk, which converts the RF signal into a digital signal by comparing the RF signal with a filtered signal provided from a first low-pass filter as the reference slice level, the apparatus comprising:
a peak holder which detects and holds a peak level of the unfiltered RF signal for a pit length according to time;
a bottom holder which detects and holds a bottom level of the unfiltered RF signal for the pit length according to time;
a second low-pass filter which low-pass filters the unfiltered RF signal to output a value of the filtered RF signal for the pit length according to time;
a controller which measures a variation in symmetry of the RF signal by using outputs of the peak holder, the bottom holder, and the second low-pass filter to determine degree of symmetry of the RF signal; and
a slice level adjuster which adjusts the reference slice level based on the degree of symmetry.

15. The apparatus according to claim 14, wherein the degree of symmetry is determined according to an equation of $$RF_{symmetry}(\%) = \frac{0.5[AVG\{(P_{LT(min)} - RF_{LPF}) + (B_{PT(min)} - RF_{LPF})\} - AVG\{(P_{LT(max)} - RF_{LPF}) + (B_{PT(max)} - RF_{LPF})\}]}{AVG[(P_{LT(max)} - RF_{LPF}) - (B_{PT(max)} - RF_{LPF})]} \times 100$$

and wherein AVG designates an average, $P_{LT(min)}$ designates a Peak Land of minimum T, $B_{PT(min)}$ designates a Bottom Pit of minimum T, $P_{LT(max)}$ designates a Peak Land of maximum $B_{PT(max)}$ designates a Bottom Pit of maximum T and $RF_{LPF}$ represents the low pass filter level of the RF signal, based upon pit lengths T detected from the RF signal.

16. A method of compensating a reference slice level in a device for slicing an unfiltered RF signal from a disk, which converts the RF signal into a digital signal by comparing the RF signal with a filtered signal provided as the reference slice level, comprising:
detecting and holding a peak level of the unfiltered RF signal;
detecting and holding a bottom level of the unfiltered RF signal;
low-pass filtering the unfiltered RF signal;
measuring a variation in symmetry of the RF signal by using by using the peak level and the bottom level of the RF signal for a pit length according to time and a result of the low-pass filtering of the RF signal for the pit length according to time to determine degree of symmetry of the RF signal; and
adjusting the reference slice level based on the degree of symmetry.

17. The method according to claim 16, wherein the degree of symmetry is determined according to an equation of $$RF_{symmetry}(\%) = \frac{0.5[AVG\{(P_{LT(min)} - RF_{LPF}) + (B_{PT(min)} - RF_{LPF})\} - AVG\{(P_{LT(max)} - RF_{LPF}) + (B_{PT(max)} - RF_{LPF})\}]}{AVG[(P_{LT(max)} - RF_{LPF}) - (B_{PT(max)} - RF_{LPF})]} \times 100$$

and wherein AVG designates an average, $P_{LT(min)}$ designates a Peak Land of minimum T, $B_{PT(min)}$ designates a Bottom Pit of minimum T, $P_{LT(max)}$ designates a Peak Land of maximum, $B_{PT(max)}$ designates a Bottom Pit of maximum T and $RF_{LPF}$ represents the low pass filter level of the RF signal, based upon pit lengths T detected from the RF signal.

* * * * *

UNITED STATES PATENT AND TRADEMARK OFFICE
CERTIFICATE OF CORRECTION

| | | |
|---|---|---|
| PATENT NO. | : 7,369,625 B2 | Page 1 of 1 |
| APPLICATION NO. | : 10/120191 | |
| DATED | : May 6, 2008 | |
| INVENTOR(S) | : Joo-yeup Kim et al. | |

It is certified that error appears in the above-identified patent and that said Letters Patent is hereby corrected as shown below:

On the title page, item [56]:

Page 2, Column 2 (Other Publications), Line 1, change "datedJan." to --dated Jan.--.

Column 4, Line 17 (Approx.), change "BL11" to --$B_{L11}$--.

Column 4, Line 18 (Approx.), change "PP11" to --$P_{P11}$--.

Column 4, Line 19 (Approx.), change "RFLPF" to --$RF_{LPF}$--.

Column 10, Line 46 (Approx.), after "maximum" insert --,--.

Column 10, Line 61, after "using" delete "by using".

Signed and Sealed this

Fourteenth Day of October, 2008

JON W. DUDAS
*Director of the United States Patent and Trademark Office*